(12) United States Patent
Hildebrand et al.

(10) Patent No.: US 8,135,444 B2
(45) Date of Patent: Mar. 13, 2012

(54) COMMUNICATION DEVICE AND METHOD FOR SETTING DEVICE RESOURCES

(75) Inventors: Uwe Hildebrand, Nuremberg (DE); Michael Esch, Nuremberg (DE); Ralf Itjeshorst, Walpertskirchen (DE)

(73) Assignee: Infineon Technologies AG, Neubiberg (DE)

(*) Notice: Subject to any disclaimer, the term of this patent is extended or adjusted under 35 U.S.C. 154(b) by 1178 days.

(21) Appl. No.: 11/853,974

(22) Filed: Sep. 12, 2007

(65) Prior Publication Data

US 2009/0070508 A1 Mar. 12, 2009

(51) Int. Cl.
*H04M 1/00* (2006.01)

(52) U.S. Cl. .......... 455/574; 455/127.1; 455/127.5; 455/450; 455/522; 455/572

(58) Field of Classification Search .......... 455/127.1, 455/127.5, 343.4, 432.2, 450, 522, 572, 574
See application file for complete search history.

(56) References Cited

U.S. PATENT DOCUMENTS

| | | | | |
|---|---|---|---|---|
| 5,909,585 A * | 6/1999 | Shinmiya | | 713/322 |
| 5,920,592 A * | 7/1999 | Tanaka et al. | | 375/220 |
| 6,397,053 B1 * | 5/2002 | Ghiazza | | 455/343.1 |
| 6,473,607 B1 * | 10/2002 | Shohara et al. | | 455/343.1 |
| 6,966,007 B2 * | 11/2005 | Kuo et al. | | 713/320 |
| 7,089,029 B2 * | 8/2006 | Cao et al. | | 455/522 |
| 7,594,132 B2 * | 9/2009 | Kim | | 713/322 |
| 7,596,379 B2 * | 9/2009 | Farnsworth et al. | | 455/450 |
| 7,813,772 B2 * | 10/2010 | Camp et al. | | 455/574 |

OTHER PUBLICATIONS

3GPP TS 25.331 V7.5.0 (Jun. 2007); *Technical Specification*; 3rd Generation Partnership Project; Technical Specification Group Radio Access Network; Radio Resource Control (RRC); Protocol Specification (Release 7).

* cited by examiner

*Primary Examiner* — Olumide T Ajibade Akonai
(74) *Attorney, Agent, or Firm* — Dickstein Shapiro LLP (57) ABSTRACT

A communication device including a memory configured to store a plurality of device resource profiles, wherein each device resource profile specifies device resources of the communication device and is associated with a respective communication connection state of a plurality of communication connection states; a determining circuit configured to determine a communication connection state of a communication connection of the communication device; and a control circuit configured to set device resources of the communication device in accordance with the device resource profile associated with the communication connection state of the communication connection.

10 Claims, 4 Drawing Sheets

COMMUNICATION DEVICE AND METHOD FOR SETTING DEVICE RESOURCES

TECHNICAL FIELD

Embodiments of the invention relate generally to a communication device and a method for setting device resources.

BACKGROUND

In mobile communication devices, it is of importance to have low power consumption. Therefore, it is desirable to have possibilities to reduce the power consumption of communication devices without limiting the functionality of the communication devices.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
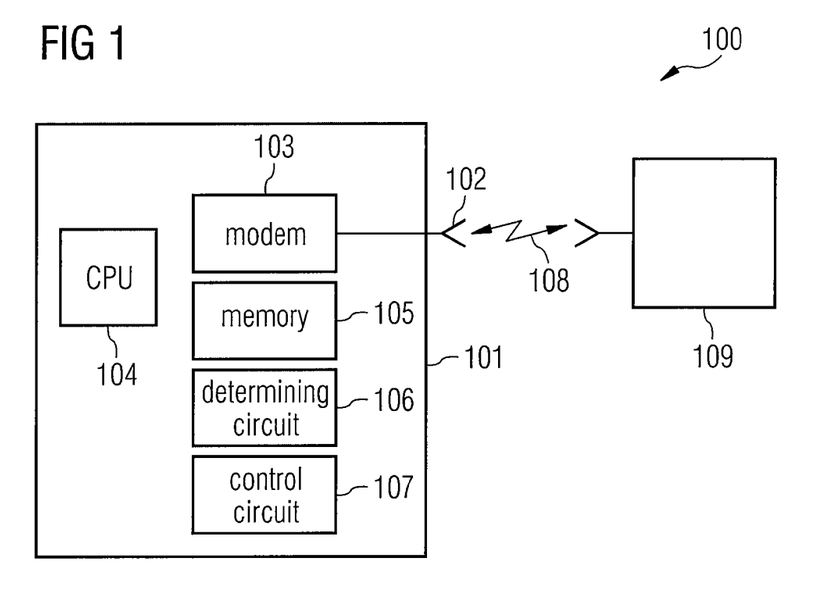
FIG. 1 shows a communication arrangement according to an embodiment of the invention.

FIG. 1 shows a communication arrangement 100 according to an embodiment of the invention.

The communication arrangement 100 includes a communication device 101, for example a mobile communication device of a cellular mobile communication system according to UMTS (Universal Mobile Telecommunication Standard), GSM (Global System for Mobile Communications), FOMA (Freedom of Mobile Access), or CDMA2000 (CDMA: Code Division Multiple Access).

The communication device 101 includes an antenna 102 which is coupled to a modem 103, or generally a transceiver, a CPU 104 and a memory 105. Further, the communication device 101 includes a determining circuit 106 and a control circuit 107. The determining circuit 106 and the control circuit 107 may for example be implemented by the CPU 104 itself.

The communication device 101 may have a communication connection 108 with another communication device 109. Data may be sent to and received from the other communication device 109 by means of the antenna 102 and the modem 103.

For example, the communication device 101 is a mobile communication device using a mobile communication network and the other communication device 109 is a base station, for example a UMTS base station (also called NodeB) or a GSM base station, depending on the type of the mobile communication system. For using the communication connection 108 the CPU 104 and the modem 103 implement a protocol stack according to the communication technology used, for example a protocol stack according to UMTS communication technology or according to GSM communication technology.

It is also a possibility that the CPU 104 and the modem 103 are able to implement a dual-mode or a multi-mode protocol stack, i.e. the CPU 104 and the modem 103 are able to handle communication connections according to different communication technologies, for example the CPU 104 and the modem 103 can provide the protocol stack for communication connections according to UMTS as well as according to GSM.

The performance demands on the CPU 104 for implementing a protocol stack may greatly vary depending on the state (or the operational condition) of the modem 103 or, correspondingly, the state of the communication connection 108. Dynamic scaling of the performance of the CPU 104 may for example be achieved by adjusting a clock frequency of the CPU 104. The performance demands on the CPU 104 may be influenced by several factors, for example the actual processing load of the CPU 104, the latency requirements of the communication connection 108, etc.

The communication device 101 may also support dynamic voltage scaling capabilities in addition to pure dynamic frequency scaling. In this case, the dynamic scaling of the clock frequency of the CPU 104 may for example be accompanied by lowering the supply voltage CPU 104 whenever possible. In this case, compared to pure dynamic frequency scaling, even more decreased energy consumption of the communication device 101 may be achieved and consequently, an increased service time of the communication device 101 may be achieved in the case that it is battery-powered, as it is typical for a mobile communication device.

Because of an increased service time, for example, it is desirable to adjust the clock frequency of the CPU 104 to the current demands on the processing power of the CPU 104.

The goals of a dynamic CPU performance setting (for example by the scaling of the CPU clock frequency) is for example to provide, at each time instant, enough CPU computational power in order to be able to perform all required processing within given deadlines and, on the other hand, to avoid unnecessarily high CPU clock frequencies in order to minimize power consumption.

For dynamic CPU performance setting, CPU performance prediction algorithms may for example be used. A drawback of these is the latency inherent for such kind of prediction algorithms. In the case that the communication device 101 is a mobile communication device a high latency may not be tolerable due to real time requirements, for example on the speed a high performance must become available, i.e. on the speed of switching from a low performance setting to a high performance setting.

Another way to set the clock frequency of the CPU 104 is to set the clock frequency according to the task the CPU 104 is currently processing. However, in this case it is not possible to handle dynamically changing performance requirements of individual tasks. If a task for example implements user data processing functions, the performance demand of the task may change depending on the current user data rate, i.e. the data rate with which user data to be processed is provided.

Furthermore, a dedicated CPU clock control may be used for controlling the CPU clock frequency. For example, according to the implemented protocol stack, there may be functions provided for allowing dedicated CPU clock control requests. However, this may lead to low flexibility and to hardware platform dependencies of the protocol stack.

As mentioned above, standard CPU performance prediction algorithms for CPU clock frequency setting often do not provide sufficient fast reaction times, i.e. have too high latency to fulfill real-time requirements and deadlines of mobile communication systems. This is for example the case when the required performance of the CPU 104 is predicted based on background idle time monitoring on CPU level or task level and when the CPU 104 is used for implementing the protocol stack for the modem 103 and the communication connection 108, i.e. for executing functions of the protocol stack, and is performing other applications.

For example, the other applications may require averaging (smoothing) of the CPU clock frequency setting on a certain level which contradicts the real-time requirements of the protocol stack, since, for example, the CPU performance requirements for providing the functions of the protocol stack may vary very fast.

Therefore, in one embodiment, for setting of the CPU clock frequency, or generally for the setting of device resources of the communication device 101, the current state of the communication connection 108, and correspondingly the state of the modem 103, are taken into account.

In one embodiment, the memory 105 is configured to store a plurality of device resource profiles, wherein each device resource profile specifies device resources of the communication device 101 and is associated with a respective communication connection state of a plurality of communication connection states. The determining circuit 106 is configured to determine a communication connection state of the communication connection 108 of the communication device 101. The control circuit 107 is configured to set device resources, for example the clock frequency of the CPU 104, of the communication device 101 in accordance with the device resource profile associated with the current communication connection state of the communication connection 108.

The communication connection state is for example a current communication connection state of the communication connection 108.

In one embodiment, the communication device 101 further includes a state information generating circuit generating information about the communication connection state. The state information generating circuit may be a part of the access stratum of the communication device 101. For example, the state information generating circuit is part of a transceiver of the communication device 101, e.g. part of the modem 103.

In one embodiment, the communication connection state corresponds to a radio resource control layer state of the communication device 101. The communication connection state may also correspond to a combination of a radio resource control layer state and a sub-state of the radio resource control layer state of the communication device 101.

Generally, the communication connection state may be the state of the communication connection 108 corresponding to the state of the communication device 101. This means that the communication connection state may also be given by the corresponding state of the communication device 101. For example, if the communication device 101 is in idle state, the corresponding communication connection state would be that the communication connection is not established. Similarly, the data rate of the communication connection 108 is reflected in the state of the communication device 101, for example in the data rate that the modem of the communication device 101 has currently set for the communication connection 108.

The sub-state is for example a medium access layer (MAC) state or a state of the physical layer.

As shown in the example of FIG. 1, the communication connection 108 is for example a communication connection 108 to another communication device 109. The communication device 101 is for example a mobile communication device and the other communication device 109 is for example a base station of a mobile communication system.

The device resource profile for example specifies a minimum CPU performance level of a CPU of the communication device 101. The device resource profile may for example specify a minimum clock frequency of a CPU of the communication device. The device resource profile may also specify a maximum latency at which a CPU performance level should be possible to be provided.

The device resource profile may also specify other device resources of the communication device 101. For example, a device resource profile may specify that a co-processor, e.g. a DSP (digital signal processor) of the communication device 101 is activated (similarly to the setting of the CPU clock, also the DSP clock frequency may be set according to the device resource profile). The device resource profile may also specify memory usage of the communication device 101, for example that certain data is to be stored in an external memory or that parts of the internal memory are to be freed. The device resource profile may also specify whether certain memory areas can be accessed or can not be accessed (and are, for example, in a low power state). For example, in one communication connection state where certain code held in memory is not used, the corresponding device resource profile may specify that the memory section holding the code should be in low power state since it is not necessary to access it. When the communication connection state changes and the code becomes necessary, the memory section may be switched back from low-power mode (according to the changed device resource profile).

A memory used in the embodiments of the invention may be a volatile memory, for example a DRAM (Dynamic Random Access Memory) or a non-volatile memory, for example a PROM (Programmable Read Only Memory), an EPROM (Erasable ROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

A circuit can be a hardware circuit, e.g. an integrated circuit, designed for the respective functionality or also a programmable unit, such as a processor, programmed for the respective functionality. A processor may be for example be a RISC (reduced instruction set computer) processor or a CISC (complex instruction set computer).

Figure 2:
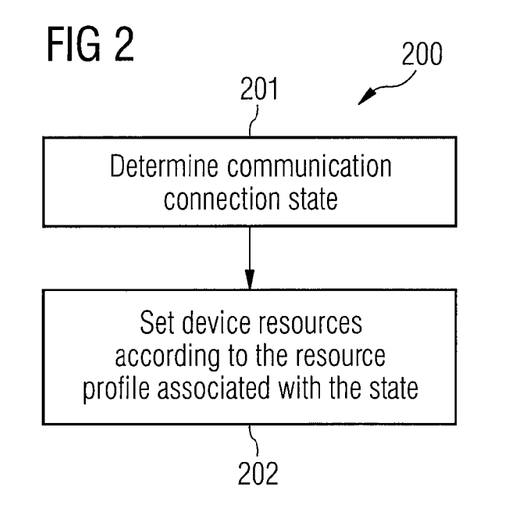
FIG. 2 shows a flow diagram according to an embodiment of the invention.

A method carried out by the communication device 101 according to an embodiment of the invention is illustrated in FIG. 2.

FIG. 2 shows a flow diagram 200 according to an embodiment of the invention.

In 201, a communication connection state of the communication connection 108 is determined wherein each device resource profile of a plurality of pre-stored device resource profiles specifying device resources of the communication device 101 is associated with a respective communication connection state of a plurality of communication connection states.

In 202, device resources of the communication device 202 are set in accordance with the device resource profile associated with the communication connection state of the communication connection 108.

In one embodiment, for satisfying the demands on the performance of the CPU 104 state or sub-state information from the access stratum is taken into account. The access stratum refers, in the case that the communication device 101 is a mobile communication device of a mobile communication system, to the units performing the network functions associated with the access network of the mobile communication system, in other words the functionalities of the mobile communication system for the transmission of useful data and signaling data such as transport control information, between the communication device 101 and the core network of the mobile communication system.

The access stratum for example provides handover functionalities and performs radio resource management. The access stratum may act as a service provider for the non-access stratum which for example provides call control application and session management functionalities as well as mobility management functionalities, authentication functionalities or billing functionalities or generally functionalities of the mobile communication system that are independent of (or not directly related to) the radio access network.

In one embodiment, illustratively, an adequate CPU performance is set for a communication device, such as a mobile phone, by using state information of a modem of the communication device as a basis for providing sufficient CPU performance for the various operational conditions of the modem while minimizing the power consumption of the communication device. CPU performance may be scaled and can be adjusted to actual instantaneous needs while satisfying latency or real-time demands of the communication system. For example, the CPU clock may be scaled according to the current performance demands. In the case of low performance demands, the CPU clock frequency is for example reduced and the supply voltage of the communication device may also be reduced by which power can be saved.

In one embodiment, the state information or sub-state information of the access stratum, i.e. the information about states of the access stratum or sub-states of the access stratum, is mapped to a parameter denoted as basic modem operation condition (BMOC). This means that for the state information or sub-state information a corresponding basic modem operation condition is defined which is used as input for a CPU clock frequency setting algorithm. According to the output of the algorithm, the clock frequency of the CPU 104 is set. For each defined basic modem operation condition, the algorithm provides a CPU performance profile according to which the clock frequency of the CPU 104 is set. In this way, it can be ensured that for each defined BMOC the adequate level of CPU performance can be made available which is necessary according to the current state and sub-states of the access stratum and correspondingly according to the current states of the communication connection 108 and the modem 103.

The basic modem operation conditions (BMOCs) can be seen as an abstraction of state and/or sub-state combinations of the access stratum of the mobile communication system or parts of the access stratum of the mobile communication system, for example the cellular modem protocol stack access stratum. The current BMOC may for example be seen as a specification of the communication connection state of the communication connection 108. The BMOC may be associated with the CPU performance profile or CPU performance level according to which the CPU clock frequency is set.

The usage of BMOCs simplifies the porting of the protocol stack onto different platforms and allows adequate CPU performance setting by providing a guaranteed CPU performance level for each BMOC which is suitable to fulfill the performance requirements of the state of the communication connection to which the BMOC corresponds.

In one embodiment, the setting of the CPU clock frequency includes the generation of state and optionally also sub-state information about the communication connection 108 in the access stratum for example by the modem 103, the mapping of the state and sub-state information onto a BMOC of a defined set of BMOCs and the implementation of a BMOC dependent CPU clock frequency setting.

Figure 3:
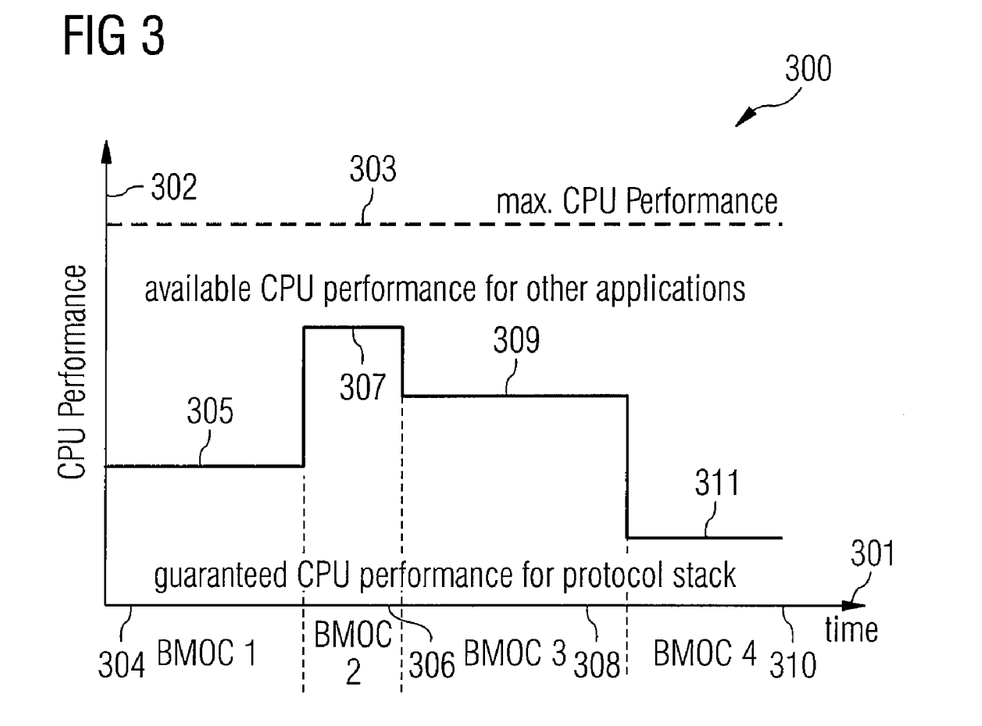
FIG. 3 shows a time-CPU performance diagram according to an embodiment of the invention.

The mapping of the BMOCs to CPU performance levels is illustrated in FIG. 3.

FIG. 3 shows a time-CPU performance diagram 300 according to an embodiment of the invention.

In the diagram 300 time is shown in the direction of the x-axis 301 and the CPU performance level is shown in the direction of the y-axis 302. A dashed line 303 indicates the maximum CPU performance, which is for example limited by the maximum clock frequency to which the clock signal of the CPU 104 may be set. In a first time interval 304 the state of the communication connection 108 corresponds to a first BMOC, denoted as BMOC1, and the CPU performance is set (at least) to a first CPU performance level 305. In a second time interval 306, the state of the communication connection 108 corresponds to a second BMOC, denoted as BMOC2, and the CPU performance is set (at least) to a second CPU performance level 307. In a third time interval 308, the state of the communication connection 108 corresponds to a second BMOC, denoted as BMOC3, and the CPU performance is set (at least) to a third CPU performance level 309. In a fourth time interval 310, the state of the communication connection 108 corresponds to a fourth BMOC, denoted as BMOC4, and the CPU performance is set (at least) to a fourth CPU performance level 311.

Note that the first CPU performance level 305, the second CPU performance level 307, the third CPU performance level 309 and the fourth CPU performance level 311 give the CPU performance that is guaranteed for processing the functions of the protocol stack. This means that if the CPU carries out tasks for other applications than for protocol stack functionalities, the CPU performance level has to be increased according to the computational needs of the other applications. Note that at most, for other applications the difference between the maximum CPU performance level indicated by the dashed line 303 and the respective CPU performance level 305, 307, 309, 311 is available for the other applications.

Depending on the latency or real-time requirements, the respective CPU performance level 305, 307, 309, 311 may be provided by means of statically applying a minimum CPU clock limit or by adjusting the CPU clock frequency setting algorithm latency so that the required CPU performance can be provided fast enough. The latency requirements may be specified according to each BMOC and may be different for different BMOCs. This means that a maximum latency for providing a certain CPU performance may be specified for each BMOC. Thus, a BMOC (or generally, a device resource profile) may specify a maximum latency at which a certain CPU performance, e.g., at which a certain CPU clock frequency, has to be possible to be provided. For example, the clock setting algorithm is configured accordingly when this BMOC is to be applied according to the current communication connection state.

The scaling of the CPU clock frequency above the guaranteed CPU performance levels 305, 307, 309, 311, i.e. the increase of the CPU performance level in case that the CPU 104 carries out other applications in addition to the functionalities of the protocol stack may for example be done with standard CPU performance setting mechanisms.

Figure 4:
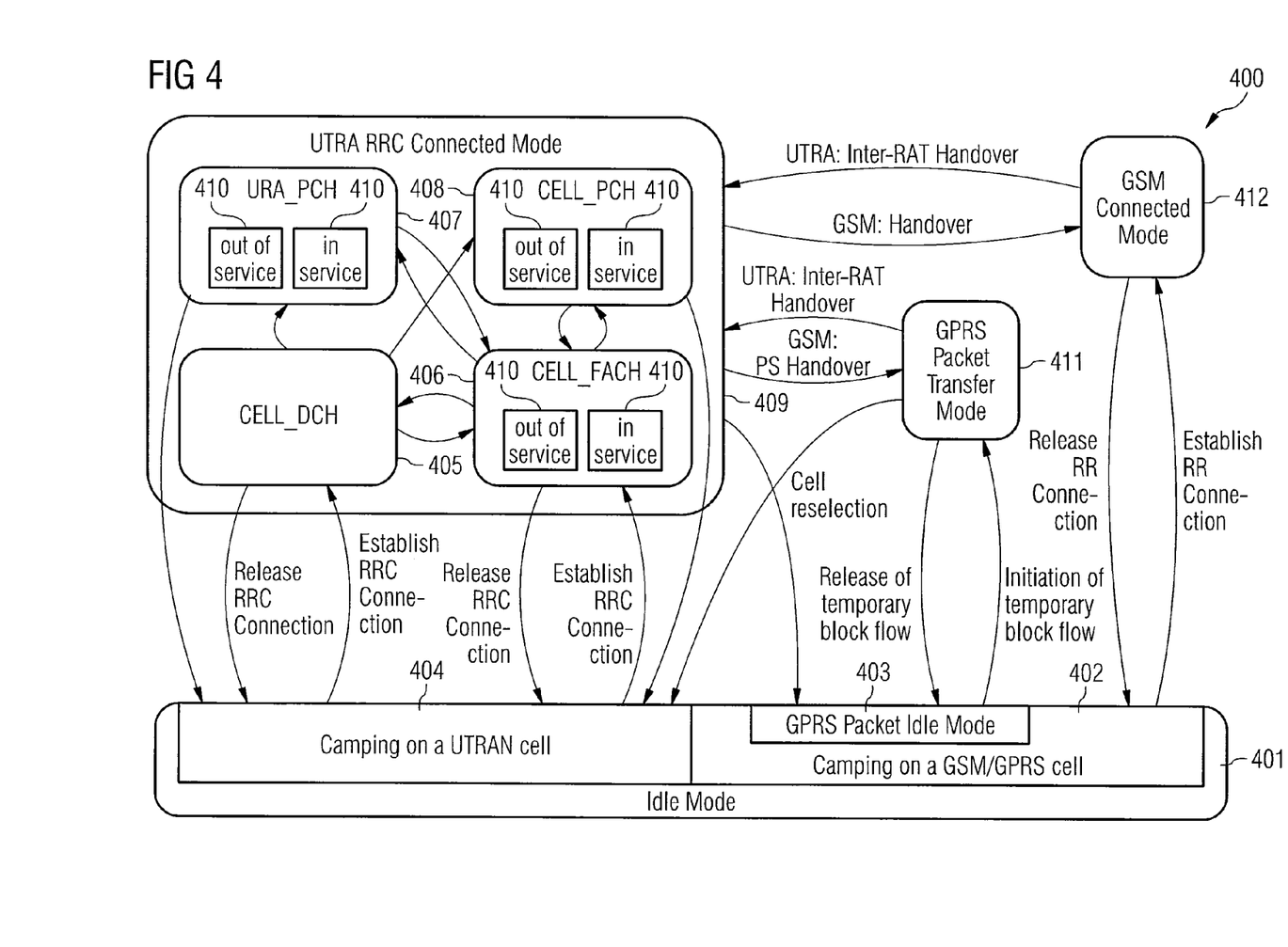
FIG. 4 shows a state diagram according to an embodiment of the invention.

An example of the possible states of the communication device 101 and correspondingly the communication connection 108 is illustrated in FIG. 4.

FIG. 4 shows a state diagram 400 according to an embodiment of the invention.

In this example, the states are RRC (radio resource control) states of the communication device 101 which is in this case a dual-mode mobile phone supporting GSM communication connections as well as UMTS communication connections. The RRC states and if desired additionally more detailed sub-state information about the states can be used to specify BMOCs which may be mapped to guaranteed CPU performance level settings.

The communication device 101 may be in idle mode 401 in which it may be camping on a UTRAN (UMTS terrestrial radio access network) cell (sub-state 404) or camping on a GSM/GPRS (general packet radio service) cell (sub-state 402). When camping on a GSM/GPRS cell the communication device 101 may be in GPRS packet idle mode (sub-state 403).

When a communication device 101 is camping on an UTRAN cell a RRC connection may be established and a communication device 101 may switch into the state CELL_DCH 405 (in case of the establishment of a dedicated connection) or into CELL_FACH 406 (in case of a shared communication connection). From CELL_DCH 405 and CELL_FACH 406, the communication device 101 may switch to URA_PCH 407 and CELL_PCH 408. In the states CELL_DCH 405, CELL_FACH 406, URA_PCH 407, and CELL_PCH 408 the communication device 101 is in UTRA RRC Connected Mode 409. The states CELL_FACH 406, URA_PCH 407 and CELL_PCH 408 may have sub-states 410. For example, the information in which sub-state the communication device 101 (and correspondingly, the communication connection) is, can be used as sub-state information.

When camping on a GSM/GPRS cell the communication device 101 may switch to GPRS packet transfer mode 411 or GSM connected mode 412.

Various state transitions are possible between the states shown in FIG. 4 as indicated by the arrows for example corresponding to the establishment and release of connections, handover of communication connections or cell reselection. For example, the information in which the communication 101 is currently in, optionally together with information in which sub-state of the state the communication device 101 is currently in, can be used to specify the current BMOC.

Note that information about a state or a sub-state of the communication device 101 can also be considered as state or sub-state information about the communication connection 108. For example, when the communication device 101 is in idle mode, state information about the communication connection 108 would be that there is no communication connection established. Additionally, there may be more than one communication connection 108 and a state information would be the number of communication connections. Further, state information about the communication connection may also be how the communication connection is handled, e.g. what procedures are used for data transmission via the communication connection.

In general, the following types of access stratum related state and sub-state information may be used for defining the BMOCs and for determining the current BMOC:

in the case that the communication device 101 supports different communication technologies, the information which radio access technology (for example according to GSM or according to UMTS) is currently selected;

the information in which (RRC) state the communication device 101 is currently in;

the control procedure which is currently active within the selected radio access technology;

the number of currently active communication connections or communication channels possibly for different types of communication channels such as logical channels, transport channels and physical channels; and the current data throughput or user data rate of the communication connection or communication connections.

In one embodiment, a dedicated component collects the state and sub-state information dynamically delivered from the various units of the access stratum. The received state and sub-state information may be consolidated such that at each time a BMOC of the set of the defined BMOCs can be associated with the state and sub-state information. A CPU performance profile providing the respective guaranteed CPU performance level is assigned to each BMOC and the CPU performance, for example the CPU clock frequency, is set in accordance with the CPU performance profile assigned to the current BMOC. The component carrying out the collection of the state and sub-state information is herein denoted as BMOC handler and is in one embodiment implemented by the control circuit 107. The mapping of state and sub-state information to CPU performance profiles for a dual-mode communication device 101 (supporting GSM/GPRS and UMTS) is illustrated in table 1.

TABLE 1

| Access Stratum | RRC State | Sub-state information | BMOC | CPU Performance Profile |
|---|---|---|---|---|
| GSM/GPRS | GSM Connected | — | 1 | LOW_PERF |
|  | GPRS Packet Transfer | RX/TX timeslot config A | 2 | MEDIUM_PERF |
|  |  | RX/TX timeslot config B | 3 | HIGH_PERF |
| UTRAN | URA_PCH | — | 4 | LOW_PERF |
|  | CELL_PCH | — | 5 | LOW_PERF |
|  | CELL_DCH | user data rate X | 6 | MEDIUM_PERF |
|  |  | user data rate Y | 7 | HIGH_PERF |
|  |  | user data rate Z | 8 | MAX_PERF |
|  | CELL_FACH | — | 9 | LOW_PERF |
| Idle Mode |  | — | 10 | LOW_PERF |

The sate and sub-state information is given by the first three columns of table 1. In column 4, the number of the BMOC associated with the respective state (and where applicable sub-state) information. In column 5 of table 1, a name of the CPU performance profile to which the respective BMOC is mapped is given. The BMOC handler may receive the information from the respective access stratum, optionally perform a consolidation of the received state and sub-state information, and determine the corresponding BMOC number.

In this example, ten different BMOCs are defined (numbered from 1 to 10) and four CPU performance profiles are defined (LOW_PREF, MEDIUM_PREF, HIGH_PREF and MAX_PREF). As sub-state information of the state GPRS packet transfer the number of utilized RX/TX time slots is used. In this example, two groups of time slot configurations are distinguished (denoted as RX/TX time slot config A and RX/TX time slot config B). For the state CELL_DCH the user data rate is used as sub-state information. In this example, the user data rate is sub-divided into three different classes (intervals) denoted as user data rate X, user data rate Y and user data rate Z.

The concept of BMOCs as an abstraction of state and sub-state combinations of the cellular modem protocol stack or correspondingly of the modem 103 or the communication connection 108, enables a simplified porting of the protocol stack onto different hardware platforms. This is due to the fact that the set of defined BMOCs may be fixed for any protocol stack implementation with a certain feature set. Only the mapping of the BMOCs on CPU performance profiles needs to be adapted to the actual hardware platform. If for example a hardware accelerator for a certain access stratum function is provided in a particular hardware platform, then less CPU performance is required for the affected BMOCs, i.e. the BMOCs corresponding to states and sub-states in which the function is needed, compared to a platform without such a hardware accelerator.

When a state and/or sub-state transition occurs the BMOC handler is updated with the latest state/sub-state information. As a consequence the BMOC may change and accordingly, the CPU performance profile is changed. This is explained in more detail in the following reference to FIG. 5.

Figure 5:
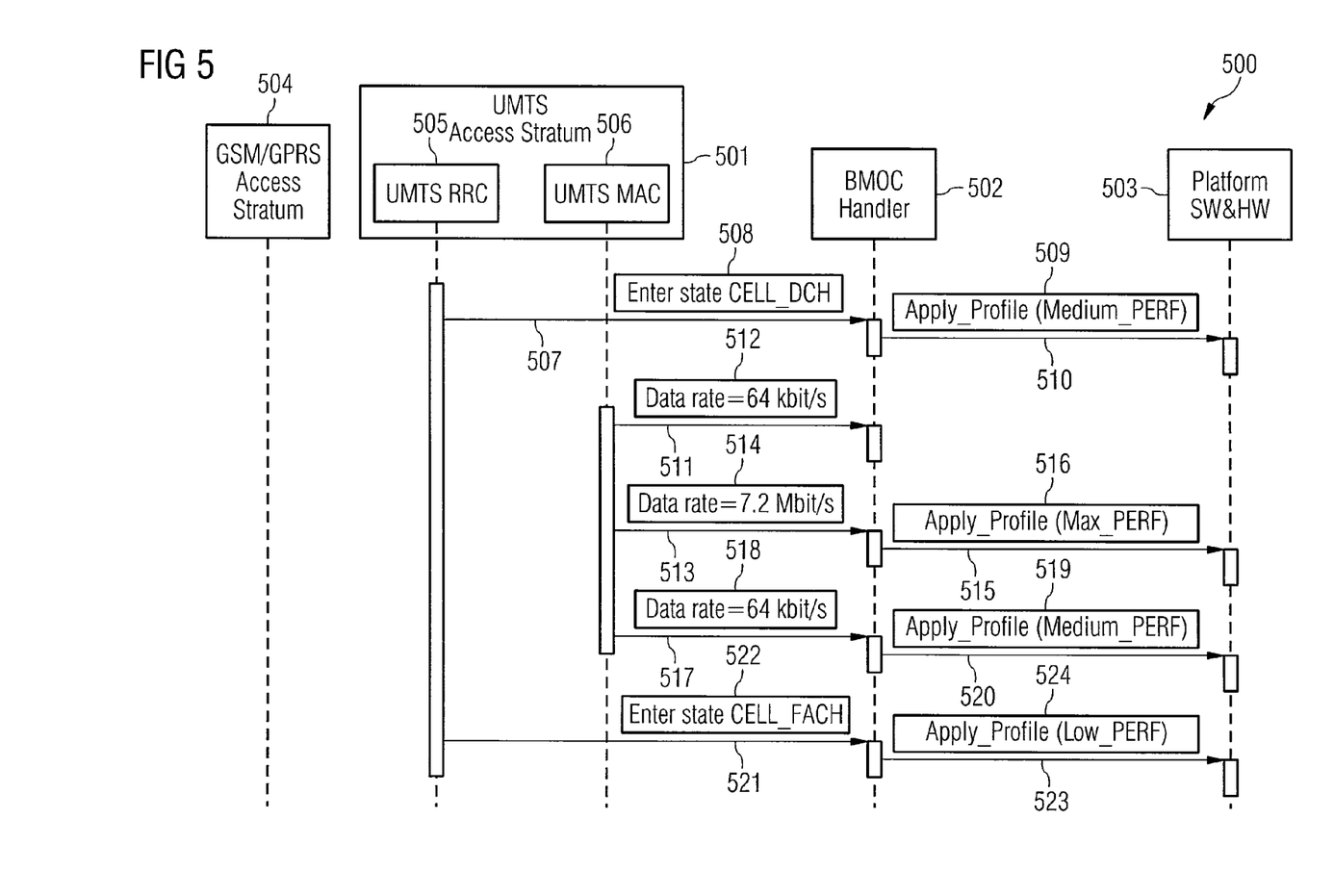
FIG. 5 shows a message flow diagram according to an embodiment of the invention.

FIG. 5 shows a message flow diagram 500 according to an embodiment of the invention.

The message flow takes place between the UMTS access stratum 501, the BMOC handler 502 and other units 503 of the communication device 101, namely the units which have to carry out controlling functions in accordance with the CPU performance level, for example a unit controlling the CPU clock frequency of the CPU 104.

The other units 503 may also include software units processing the current CPU performance profile (for example a power manager program) which is responsible for applying the current CPU performance profile, i.e. configuring the hardware resources such as the CPU clock frequency of the communication device 101 in accordance with the current CPU performance profile. A CPU performance profile for example defines a minimum CPU clock frequency assuring the required guaranteed CPU performance level.

For illustration, the GSM/GPRS access stratum 504 is also shown but since it is assumed that the currently selected RAT is the UMTS RAT the GSM/GPRS access stratum 504 does not participate in the message flow. In this example, the communication device 101 is a dual-mode communication device supporting GSM/GPRS communication connections and UMTS communication connections.

The UMTS access stratum 501 is in this example divided into the UMTS RRC layer 505 and the UMTS MAC (medium access) layer 506.

In this example, it is assumed that the user data rate X mentioned in table 1 is 64 kbit/s and that the user data rate Z mentioned in table 1 is 7.2 Mbit/s.

In 507, the UMTS RRC layer 505 sends a first message 508 to the BMOC handler 502 specifying that the RRC state CELL_DCH 508 is entered. The unit of the RRC layer 505 providing this information may for example be a protocol stack software process running on the CPU 104. Note that also, the BMOC handler 502 may be a process running on the CPU 104.

The BMOC handler 502 sends, in 510, in accordance with the information that the state CELL_DCH 508 is entered, a first command 509 to the other units 503 instructing the other units 503 to apply the profile denoted MEDIUM_PREF.

In 511, a unit of the MAC layer 506, which may also be a process running on the CPU 104 or may also be a part of the modem 103 sends a second message 512 to the BMOC handler 502 with the information that the data rate is set to 64 kbit/s. Since in this example, this data rate corresponds to BMOC number 6 (cf table 1) which is mapped to MEDIUM_PREF which is already applied according to the first command 509, the BMOC handler 502 does not send a further command to other units 503.

In 513, the MAC layer 506 sends a third message 514 to the BMOC handler 502 specifying that the data rate is now set to 7.2 Mbit/s. Since in this example, the data rate 7.2 Mbit/s corresponds to BMOC number 8 (cf table 1), in 515, the BMOC handler 502 maps the BMOC number 8 to the corresponding CPU performance profile MAX_PREF and sends a second command 516 to the other units 503 instructing them to apply the CPU performance profile MAX_PREF.

In 517, the MAC layer 506 sends a fourth message 518 to the BMOC handler 502 specifying that the data rate is again reduced to 64 kbit/s. Consequently, the BMOC handler 502 sends a third command 519 in 520 to the other units 503 instructing them to apply the profile MEDIUM_PREF.

In 521, the RRC layer 502 sends a fifth message 522 to the BMOC handler 502 signaling that the state CELL_FACH is entered. In 523, the BMOC handler 502 sends a fourth command 524 to the other units 503 instructing them to apply the profile LOW_PREF to which BMOC number 9 is mapped which corresponds to the state CELL_FACH.

In general, the state and sub-state information can be provided by different components within the access stratum of the communication device 101 to the BMOC handler, depending on where this information can best be generated. In the example described with reference to FIG. 5 RRC state information is provided by units of the RRC layer 505 and sub-state information is provided by units of the MAC layer 506, in this example the current user data rate.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device comprising:
   a memory configured to store a plurality of device resource profiles, wherein each device resource profile specifies device resources of the communication device and is associated with a respective communication connection state of a plurality of communication connection states;

a determining circuit configured to determine a communication connection state of a communication connection of the communication device; and a control circuit configured to set device resources of the communication device in accordance with the device resource profile associated with the communication connection state of the communication connection, wherein the communication connection state corresponds to a radio resource control layer state of the communication device, and corresponds to a combination of a radio resource control layer state and a sub-state of the radio resource control layer state of the communication device.

2. The communication device according to claim 1, wherein the sub-state is a medium access layer state or a state of the physical layer.

3. A communication device comprising: a memory configured to store a plurality of device resource profiles, wherein each device resource profile specifies device resources of the communication device and is associated with a respective communication connection state of a plurality of communication connection states; a determining circuit configured to determine a communication connection state of a communication connection of the communication device; and a control circuit configured to set device resources of the communication device in accordance with the device resource profile associated with the communication connection state of the communication connection, wherein the communication connection state corresponds to a radio resource control layer state of the communication device, and corresponds to a combination of a radio resource control layer state and a sub-state of the radio resource control layer state of the communication device, and wherein the device resource profile specifies a maximum latency at which a CPU performance level should be possible to be provided.

4. A method for setting device resources comprising:

determining a communication connection state of a plurality of communication connection states of a communication connection of a communication device, wherein each device resource profile of a plurality of pre-stored device resource profiles specifies device resources of the communication device and is associated with a communication connection state of the plurality of communication connection states; and setting device resources of the communication device in accordance with the device resource profile associated with the communication connection state of the communication connection, wherein the communication connection state corresponds to a radio resource control layer state of the communication device, and corresponds to a combination of a radio resource control layer state and a sub-state of the radio resource control layer state of the communication device.

5. The method according to claim 4, wherein the communication connection state is a current communication connection state of the communication connection.

6. The method according to claim 4, wherein the sub-state is a medium access layer state.

7. The method according to claim 4, wherein the communication connection is a communication connection to another communication device.

8. The method according to claim 7, wherein the communication device is a mobile communication device and the other communication device is a base station of a mobile communication system.

9. A non-transitory computer program element having stored thereon a computer program with a program code, which, when executed by a processor of a communication device, makes the communication device perform a method for setting device resources comprising:

determining a communication connection state of a plurality of communication connection states of a communication connection of the communication device, wherein each device resource profile of a plurality of pre-stored device resource profiles specifies device resources of the communication device and is associated with a communication connection state of the plurality of communication connection states; and setting device resources of the communication device in accordance with the device resource profile associated with the communication connection state of the communication connection, wherein the communication connection state corresponds to a radio resource control layer state of the communication device, and corresponds to a combination of a radio resource control layer state and a sub-state of the radio resource control layer state of the communication device.

10. A communication device comprising: a memory configured to store a plurality of CPU performance profiles, wherein each CPU performance profile specifies a minimum CPU performance of a CPU of the communication device and is associated with a respective communication connection state of a plurality of communication connection states; a determining circuit configured to determine a current communication connection state of a communication connection of the communication device; and a control circuit configured to set the performance of the CPU of the communication device in accordance with the CPU performance profile associated with the communication connection state of the communication connection, wherein the current communication connection state corresponds to a radio resource control layer state of the communication device, and corresponds to a combination of a radio resource control layer state and a sub-state of the radio resource control layer state of the communication device.

* * * * *